W. T. CRENSHAW & R. J. CAROTHERS.
Cotton-Presses.

No. 158,403.  Patented Jan. 5, 1875.

WITNESSES:
E. Wolff
A. F. Terry

INVENTOR:
William T. Crenshaw
Robert J. Carothers
BY
ATTORNEYS.

UNITED STATES PATENT OFFICE.

WILLIAM T. CRENSHAW AND ROBERT J. CAROTHERS, OF BURTON, TEXAS.

IMPROVEMENT IN COTTON-PRESSES.

Specification forming part of Letters Patent No. 158,403, dated January 5, 1875; application filed November 14, 1874.

*To all whom it may concern:*

Figure 1:
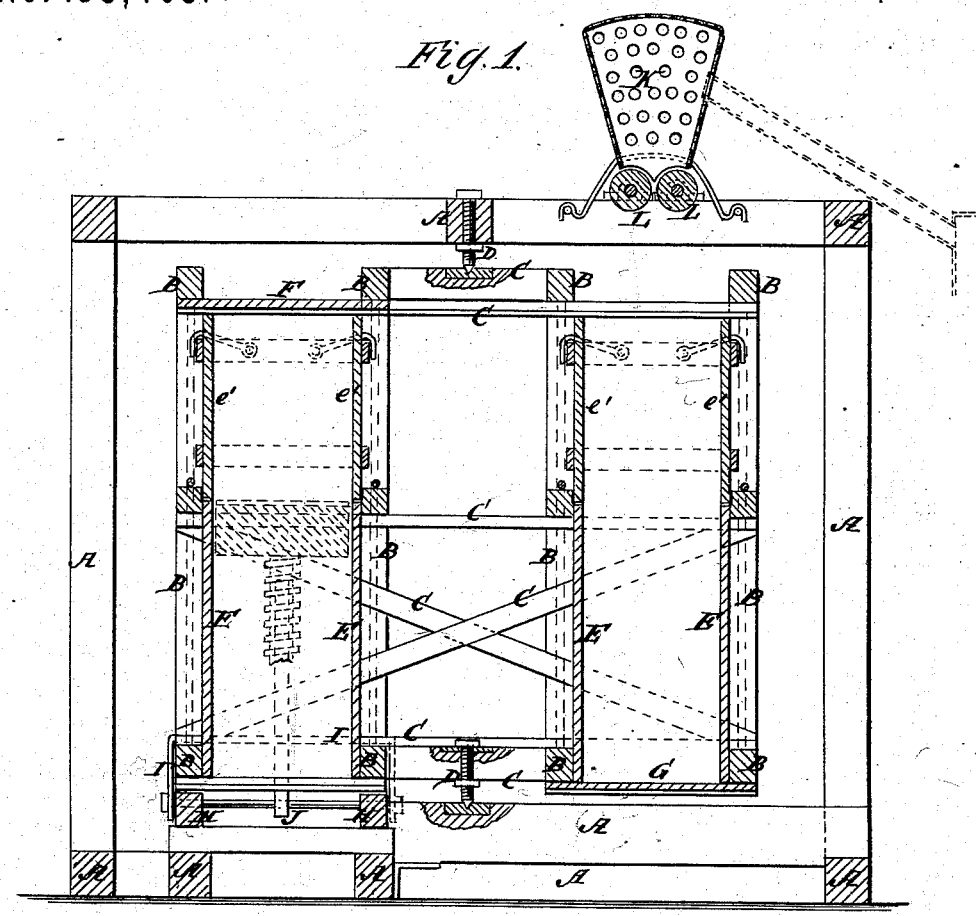
Figure 2:
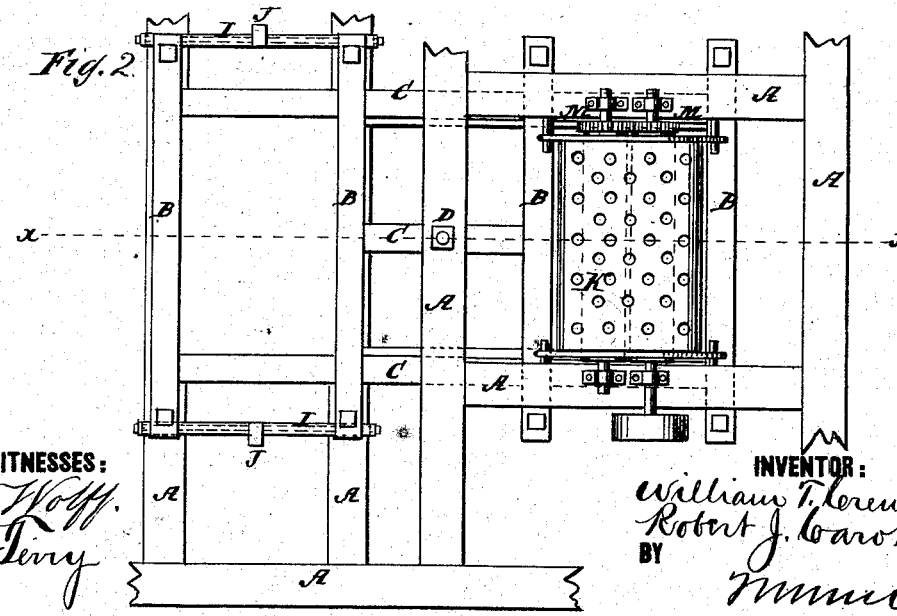

Be it known that we, WILLIAM T. CRENSHAW and ROBERT J. CAROTHERS, of Burton, in the county of Washington and State of Texas, have invented a new and useful Improvement in Cotton-Press, of which the following is a specification:

Figure 1 is a vertical section of our improved cotton-press, taken through the line x x, Fig. 2. Fig. 2 is a top view of the same, parts of the frame-work being broken away.

Similar letters of reference indicate corresponding parts.

Our invention has for its object to furnish an improved press for baling cotton as it comes from the gin, thus avoiding the handling of the cotton, and the consequent injury to the staple, which will enable the operations of ginning and baling to be carried on at the same time and continuously.

The invention relates to the perforated hopper into which the cotton is received from the gin, and from which it is discharged by feed-rollers into the press; also, to the means of locking the revolving press-box to a fixed base, and thereby relieving its pivot-bearings of the strain due to the action of the screw which operates the follower, as hereinafter described.

A represents a frame, which may be the frame-work of a gin-house or other building, or a frame built expressly to receive the press. B represents the frames of two baling-boxes, which are placed near and are rigidly connected with each other by a frame-work, C. To the centers of the center bars of the connecting frame-work C are attached pivots D, the ends of which work in sockets or steps attached to the bars of the frame A. The frames B of the baling-boxes are strengthened with tie-rods, and are provided with a casing, E. The upper part e' of the casing E is made detachable to enable the compressed bale to be conveniently removed. F is the head-block, against which the cotton is pressed, and which is placed in grooves in the top bars of the frame-work B C, so that it can be conveniently removed to allow the baling-box to be filled from its upper end.

The grooves for the head-block F may be so formed that the head-block F may be slipped from one to the other of the two baling-boxes to uncover the one to be filled, and cover the one in which the bale is to be pressed. The bale is pressed by a follow-block operated by a screw, and which passes in through the lower end of the baling-box.

The baling-boxes are provided with detachable bottoms G, which are slipped into grooves in the base-bars of the frames of said boxes when the cotton is to be introduced, and are removed when the filled baling-box is swung over the screw to allow the follow-block to enter. To the frame A, directly beneath the lower end of the baling-box, when said box is over the compressing-screw, is secured a frame, H, to the ends of which are pivoted the ends of two bails, I, which are designed to be turned up over the ends of the base-frame of the said baling-box, to hold it against the pressure of the follower while the bale is being compressed. The bails I are provided with levers J, for convenience in operating them.

When the bale is being compressed in one baling-box, the other stands exactly beneath the hopper K, which is attached to the top bars of the frame A, and in one side of which is formed a transverse slot, with which is designed to be connected the spout or flue from the ginning-machine, so that the cotton may be delivered directly from the gin into the hopper. The top, sides, and ends of the hopper K are perforated with numerous holes, to allow the current of air from the gin to escape freely without carrying the cotton with it. The bottom of the hopper K fits upon two rollers, L, by which the cotton is taken from the hopper K, and is fed into the baling-box. The rollers L are connected with each other by gear-wheels M, so that they may move together, and motion is given to them by a belt from any convenient power.

We do not claim bands applied to a press-box to adapt it to resist the action of the screw-follower.

Having thus described our invention, we claim as new and desire to secure by Letters Patent—

1. The hopper K, provided with perforations and the rollers L, to permit discharge of dust while the cotton is fed downward, as shown and described.

2. The bails I, hinged to the frame A, and provided with handles J, in combination with the press-box mounted on pivot-bearings D, and provided with projecting beams at the base, as and for the purpose specified.

WILLIAM T. CRENSHAW.
ROBERT J. CAROTHERS.

Witnesses:
   JAS. S. BOYD,
   A. A. CAMPBELL.